March 26, 1957 R. INEICHEN 2,786,688
HYDRAULICALLY OPERATED TOOL EJECTING DEVICE
Filed Sept. 17, 1953
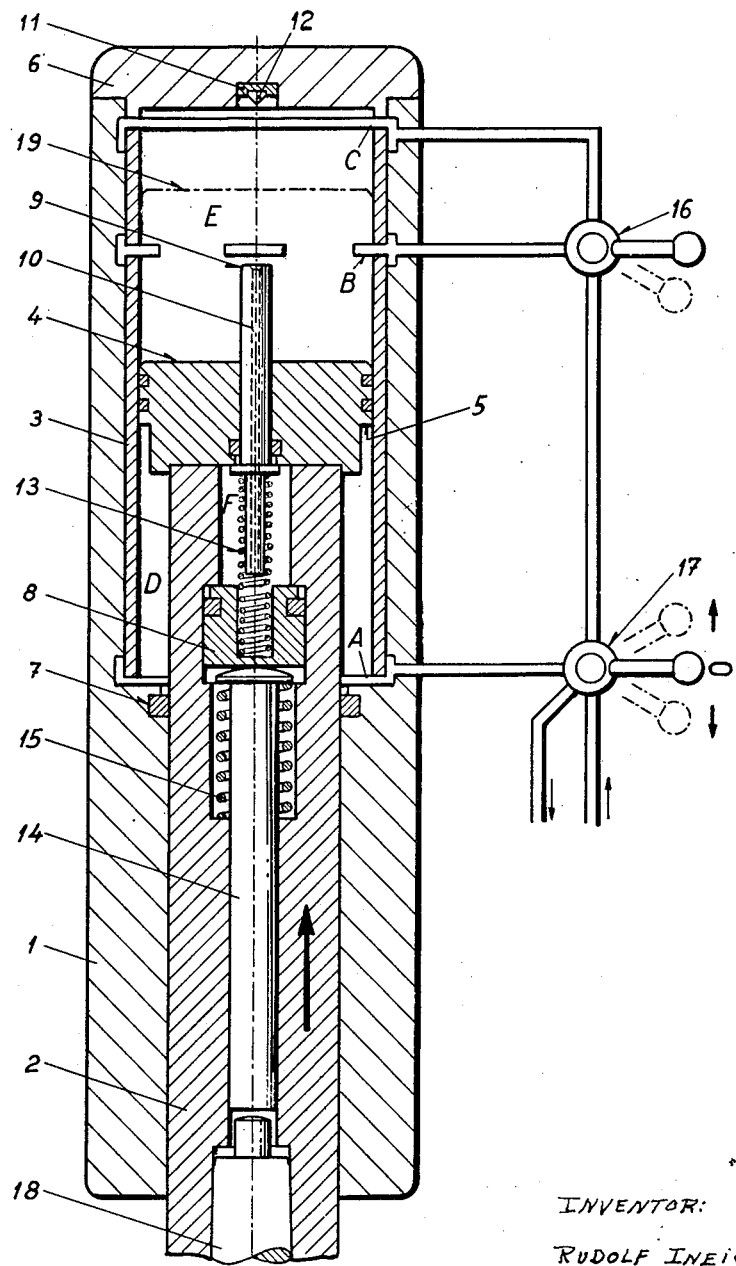
INVENTOR:
RUDOLF INEICHEN
BY:

United States Patent Office 2,786,688
Patented Mar. 26, 1957

2,786,688

HYDRAULICALLY OPERATED TOOL EJECTING DEVICE

Rudolf Ineichen, Zurich, Switzerland, assignor to Machine Tool Works Oerlikon, Administration Company, Zurich-Oerlikon, Switzerland, a Swiss company Application September 17, 1953, Serial No. 380,819

Claims priority, application Switzerland September 24, 1952

2 Claims. (Cl. 279—103)

The invention relates to a hydraulically operated tool ejecting device for machine tools, for example boring machines and head stocks of turner's lathes in which the tool holder is moved hydraulically.

The invention has the main object of effecting the ejection of the tool, which requires very strong forces, without excessive mechanical stresses of the structural components and consequent wear and tear.

A tool ejecting device according to the invention comprises in combination: a tool carrier, an ejector pin arranged longitudinally shiftable in the said tool carrier and having its outer end located adjacent the tool to be ejected, a shiftable operating member, and a hydraulic pressure multiplicator member hydraulically in operative connection with the said operating member and located adjacent the inner end of the said ejector pin.

The term "hydraulic pressure multiplicator member" as used in this specification and claims defines an arrangement of two pistons or plungers of different effective area extending into a common chamber filled with hydraulic fluid, the inward movement of the member having the smaller effective area being transmitted to the member with the larger effective area with a force increased in the ratio of the two effective areas and a stroke reduced in the inverse ratio thereof. Such hydraulic pressure multiplicator members are well known in themselves as components of hydraulic machinery, for example of hydraulic presses, hydraulic jacks etc.

Preferably the said tool carrier is itself hydraulically shiftable, and the said hydraulic pressure multiplicator member is arranged in its interior, the said shiftable operating member coming into action on the said hydraulic pressure multiplicator upon the said tool carrier exceeding a predetermined normal working stroke. For example a working piston is fixedly connected to the said tool carrier and an ejector piston is shiftably mounted in the interior thereof adjacent the inner end of the said ejector pin, an operating member being shiftably mounted in the said working piston and having a plunger portion of a diameter smaller than the said ejector piston extending into the interior of the said tool carrier, the said interior being filled with hydraulic fluid, and a fixed abutment in alignment with the inner end of said operating member and contacted by the same when the said working piston exceeds its predetermined inward stroke being provided, whereby the said operating member is driven with its said plunger portion into the interior of the tool carrier, and consequently drives the said ejector piston with multiplied force against the inner end of the said ejector pin.

Resilient means may be arranged between the said ejector piston and the said operating member which, in the rest position, force the said ejector piston and operating member apart. Obturator means may be mounted on the said abutment which close a longitudinal bore going right through the said operating member when the latter abuts on the said abutment, the said bore normally connecting the interior of the said tool carrier with the space adjacent the inner working face of the said working piston.

These and other objects and features of the present invention will be clearly understood from the following detailed description of a preferred embodiment illustrated by way of example in the accompanying drawing which is a longitudinal section of a tool ejecting device according to the invention.

In the casing 1 of the head stock of a turner's lathe (otherwise not shown) a socket 2 is mounted axially shiftable. The rear portion of the casing 1 is constructed as a hydraulic pressure cylinder, and contains a cylinder liner 3 with control ports A, B and C distributed over its circumference. In the cylinder liner 3 a working piston 4 is arranged which is rigidly connected to the socket 2 and has a control edge 5. The pressure cylinder is closed at its rear end by a lid 6, and is sealed at the front by suitable gland means 7 in relation to the axially shiftable socket 2. Between the lid 6 and the rear end face of the working piston 4 an outer pressure chamber E is enclosed, and between the annular front face of said working piston 4 and the casing 1 a pressure chamber D is enclosed. The interior of the socket 2 contains a second hydraulic pressure cylinder or inner pressure chamber F, in which the ejector piston 8 is arranged axially shiftable. Moreover an operating member 9 which is shiftably mounted in the working piston 4 extends with one of its ends, which is formed as a pressure plunger with a collar on it, into the said second pressure cylinder F, while its other end extends in the rest position a certain distance into the said outer pressure chamber E. A bore 10 going right through the length of the operating member 9 connects the said inner pressure chamber F with the said outer pressure chamber E. The lid 6 has an abutment piece 11 affixed which carries obturator means 12 lying in the cylinder axis which are engaged by the operating member 9 in the rearmost position of the working piston 4, so that the bore 10 is closed and communication between the pressure chambers E and F is interrupted. The pressure chambers D, E and F are permanently filled with oil.

A coiled compression spring 13 arranged between the ejector piston 8 and the pressure plunger portion of the operating member 9 forces these two elements apart in the rest position, i. e. the ejector piston 8 against the ejector pin 14, and the pressure plunger portion of the operating member 9 with its collar against the working piston 4. The ejector pin 14 is in turn held by a strong coiled compression spring 15 in its rest position as drawn so that it does not press on the tool 18 which is provided with a Morse cone. The control ports A and C are connected in the usual manner to the pressure oil system of the machine tool via the diagrammatically represented control valve 17. The control port B is connected by a pipe with the control port C via the diagrammatically represented ejector valve 16.

The manner of operation of the device described hereinabove is as follows:

The normal working stroke of the socket 2 extends from the outer end position of the working piston 4 to the inner end position 19 thereof indicated in the drawing in chain-dotted lines, in which position the control edge 5 of the piston 4 clears the control port B. When for example pressure oil is admitted through the control port A into the cylinder space D, and at the same time the control port B is connected to the oil return pipe via the opened ejector valve 16, the socket 2 moves in the inward direction until the control edge 5 clears the control port B. By the supply of pressure oil to the control port C and simultaneously switching over the control port A to the oil return pipe by means of the control valve 17, an opposite movement of the socket 2, i. e. in the outward direction, is attained.

In order to eject the tool, the control port A is supplied with pressure oil, and the passage to the control port B is closed by means of the ejector valve 16, while the control port C is connected to the oil return pipe. The working piston 4 then runs beyond the control port B in its movement in the inward direction, and the operating member 9 abuts on the abutment piece 11, so that its bore 10 is closed by the obturator means 12. Since the working piston 4 continues running in the inward direction, the pressure plunger portion of the operating member 9 is forced into the oil filled space F. The oil displaced then acts on the ejector piston 8 and shifts the same towards the ejector pin 14 which in turn moves against the tool 18, and ejects the same.

While I have described and illustrated what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A tool ejecting device for machine tools comprising in combination a casing having a cylindrical bore therein, a tool carrier, having an inner pressure chamber therein being longitudinally displaceable in said bore, a working piston slidable in said bore and connected to said tool carrier, hydraulic means connected to said bore to limit the course of said working piston to a predetermined normal working stroke and to extend said course beyond said normal working stroke, a pressure multiplicator comprising an ejector pin having an end extending into said inner pressure chamber slidable in said tool carrier and being longitudinally displaceable therein for transmitting an ejecting movement to a tool carried by said carrier and an operating member slidable in said working piston and having one end extending into said inner pressure chamber shiftable by displacement of said working piston beyond said normal working stroke to actuate a hydraulic pressure directed in the sense of the ejecting movement against the ejector pin.

2. A tool ejecting device for machine tools comprising in combination a casing having a coaxial hydraulic cylinder therein, a tool carrier having an inner pressure chamber therein longitudinally displaceable in said cylinder, a working piston slidable in said hydraulic cylinder and connected to said tool carrier, hydraulic means connected to said cylinder to limit the course of said working piston to a predetermined normal working stroke and to extend said course of said working piston beyond said normal working stroke, an ejector pin longitudinally slidable in said tool carrier and having its outer end located adjacent the tool to be ejected and its inner end extending into said inner pressure chamber, an ejector piston displaceably mounted in inner pressure chamber adjacent the inner end of the ejector pin, an operating member displaceably mounted in the said working piston and having a plunger portion of a diameter smaller than said ejector piston extending into said inner pressure chamber, said chamber being filled with hydraulic fluid, a fixed abutment in the end of said cylinder in alignment with said operating member, said operating member abutting on said abutment when said working piston displaces beyond said normal working stroke, and thereby being driven with its plunger portion into said inner pressure chamber and driving said ejector piston with multiplied force outwards against the inner end of said ejector pin.

References Cited in the file of this patent

UNITED STATES PATENTS

| | | |
|---|---|---|
| 982,740 | Mullinnix | Jan. 24, 1911 |
| 1,125,147 | Merliss | Jan. 19, 1915 |
| 2,396,778 | Flowers | Mar. 19, 1946 |
| 2,470,399 | Holben | May 17, 1949 |

FOREIGN PATENTS

| | | |
|---|---|---|
| 634,966 | Great Britain | Mar. 29, 1950 |